United States Patent [19]
Walch

[11] 3,730,212
[45] May 1, 1973

[54] TRAILER WATER FILLING SYSTEM

[76] Inventor: Leon E. Walch, 15660 Crescent Wood, East Detroit, Mich. 48048

[22] Filed: May 24, 1971

[21] Appl. No.: 146,316

[52] U.S. Cl.................137/355.12, 137/355.26
[51] Int. Cl. .................................B65h 75/40
[58] Field of Search..................137/355.26, 355.12, 137/355.16, 355.17, 355.18, 355.19, 355.2, 355.21, 355.22, 355.23, 355.24, 355.25, 355.27, 355.28, 344, 343, 351

[56] References Cited

UNITED STATES PATENTS

| | | | |
|---|---|---|---|
| 2,477,769 | 8/1949 | Rice | 137/351 X |
| 726,580 | 4/1903 | Shannon | 137/355.12 X |
| 902,801 | 11/1908 | Bergland | 137/355.2 X |
| 2,063,727 | 12/1936 | Davis, Jr. | 137/355.26 X |
| 2,285,581 | 6/1942 | Horton | 137/351 X |
| 2,615,755 | 10/1952 | Crawford | 137/355.26 |
| 3,118,492 | 1/1964 | Stone | 137/351 X |
| 3,433,246 | 3/1969 | Henry et al. | 137/351 |

Primary Examiner—Samuel Scott
Attorney—William L. Fisher

[57] ABSTRACT

A trailer water filling system is disclosed for use with a trailer having a water storage tank for supplying fresh water and having a towing tongue by which said trailer is towed, said water filling system comprising first metal water piping constructed to be permanently fitted to said trailer and to extend thereon from the outlet of said water storage tank to the front of said trailer at the tongue thereof, support means constructed to be made fast to said tongue for supporting the front end of said first metal water piping hose reel assembly constructed to be removeable and portable in respect to said trailer and including second metal water piping rotatably supporting said hose reel, said second metal water piping supported at said tongue on said first metal water piping, and a rotating seal union joining the inner end of said second metal water piping and the outer end of said first metal water piping, and a flexible hose carried in coiled form on said reel having its inner end connected to the outer end of said second metal piping.

1 Claim, 3 Drawing Figures

Patented May 1, 1973

3,730,212

LEON E. WALCH
INVENTOR

BY William L. Fisher Esq.
HIS ATTORNEY

TRAILER WATER FILLING SYSTEM

My invention relates to trailers having water storage tanks for supplying fresh water and towing tongues by which said trailers are towed.

The principal object of my invention is to provide a water filling system for such trailers facilitating the filling of water storage tanks thereon, so that the same may be readily available at low cost to owners and users of said trailers.

Figure 1:
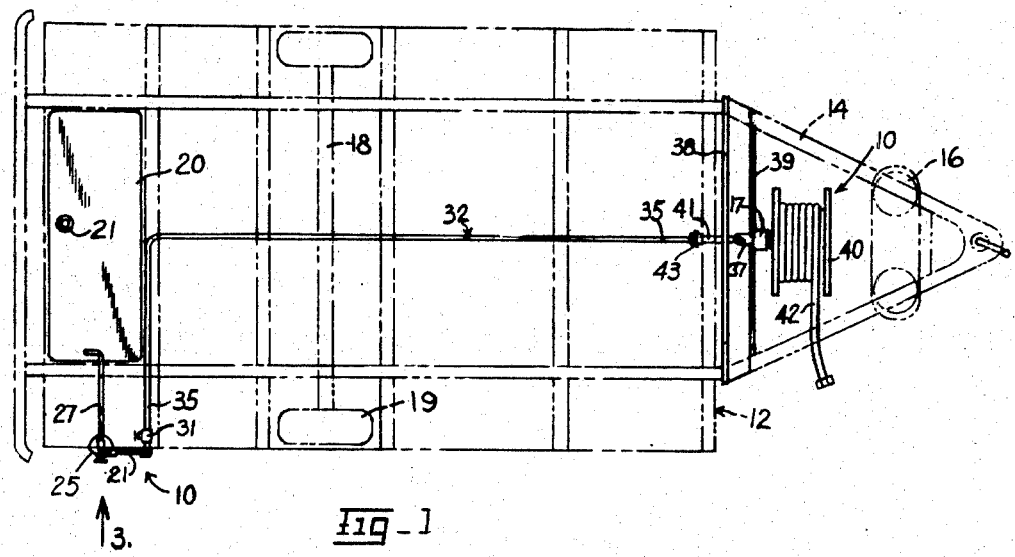
Figure 2:
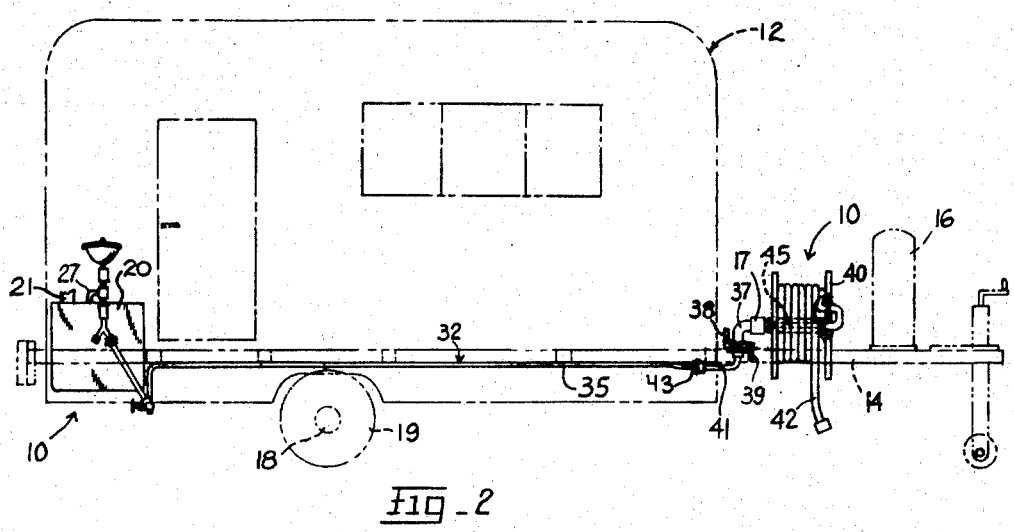
Figure 3:
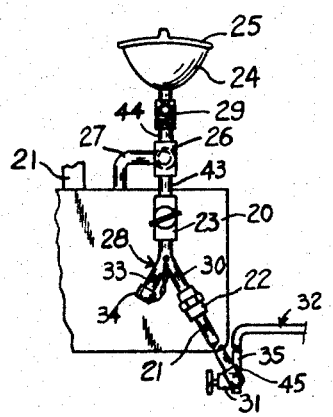

The foregoing object of my invention and the advantages thereof will become apparent during the course of the following description, taken in conjunction with the accompanying drawings, in which:

FIGS. 1 and 2 are, respectively, side elevational and top plan views of a trailer water filling system embodying my invention shown installed on a travel trailer; and FIG. 3 is an enlarged view of a portion of FIG. 2 as viewed in the direction of the arrow 3 therein.

Referring to the drawings in greater detail, 10 generally designates said embodiment of water filling system and 12 said travel trailer having a body supported on an axle 18 and wheels 19 located rearwardly of the center thereof. Said travel trailer 12 has a tongue 14 on the front end thereof on which, as is usual, a pair of LP gas tanks 16 are supported. 20 designates a water storage tank having outlet port means 21 which usually is connected to a sink (not shown) in the travel trailer 12 and having inlet port means in the form of non-flexible ferrous metal piping consisting of a pipe 27 having the lower end thereof communicating with the interior of said water storage tank 20 and the upper end thereof connected to a T-pipe fitting 26, the upper end of which is connected through a nipple 44 and a check valve 29 to a cup structure 24 fast to the outside of said travel trailer 12 having a liftable cover 25 for filling said water storage tank 20 by pouring water into said cup structure 24. The lower end of said T-pipe fitting 26 is connected through a nipple 43 and a gate valve 23 to the upper end of a Y-pipe fitting 28, one of the lower ends 30 of which is connected through a union 22 to the rear end of non-ferrous metal tubing 32 consisting of copper tubing sections 21 and 35. The front end of said copper tubing section 21 is connected to one end of a drain cock 31 the other end of which is connected to the rear end of said copper tubing section 35. The other lower end 33 of said Y-pipe fitting 28 is provided with male garden hose threads thereon and, in the instance, is capped by a cap 34. Water under pressure can be pumped through the end 33 when the valve 23 is open for filling said water storage tank 20. Said copper tubing 35 extends transversely and longitudinally of said travel trailer 12 from said drain cock 31 to the front end of said travel trailer 12 where it joins through a union 43 ferrous metal piping consisting of threadably connected pipe sections 41 and 39, the latter of which is made fast, as by welding, to and supported by angle plates 38 and 39 which are welded together back to back and extend transversely of said tongue 14 at the rear end thereof. Said angle plate 39 extends between opposite sides of said tongue 14 while said angle plate 38 is supported on top of said opposite sides. The rear end of the pipe section 41 is joined to said union 43 and the front end of the pipe section 37 is joined through a rotating seal union 17 to the rear end of a pipe section 45 which rotatably supports a hose reel 40 having flexible conduit means in the form of a garden hose 42 wrapped therearound. The front end of said pipe section 34 is provided with male garden hose threads which threadably engage a female garden hose connection on the rear end of said garden hose 42, the front end of which is free for use to pay out the garden hose 42 from said reel 40 and to connect to a water supply source remote from said travel trailer 12.

In construction and use of said trailer water filling system 10 the same may be used in original equipment manufacture by incorporating said water supply filling system 10 in the original fabrication of said trailer or in aftermarket installations by installing said system on existing trailers as shown in FIGS. 1, 2 and 3. In installing said water supply filling system 10 on said travel trailer 12 the ferrous metal piping at the rear end thereof is connected via said nipple 43 to said T-pipe fitting 26 and the ferrous metal piping at the front end thereof is fastened via said angle plates 38 and 39 to said tongue 14. Said non-ferrous metal tubing 32 is fastened to the underside of said travel trailer 12 and the front end thereof is connected via the union 43 to the rear end of the pipe section 41 and the rear end thereof is connected via the union 22 to the lower end 30 of said Y-pipe fitting 28. Said hose reel 40 is mounted on said pipe section 45 and said garden hose 42 is wrapped therearound. The front end of said garden hose 42 is left free and the rear end thereof is connected to the front end of said pipe section 45. During transportation of said travel trailer 12 said garden hose 42 is maintained coiled on said hose reel 40 and the free front end thereof may be secured on said reel 40 by any suitable fastening means not shown. When it is desired to fill said water storage tank 20 said garden hose 42 is payed out from said hose reel 40 via the free end thereof and the latter is connected to a water supply source remote from said travel trailer 12 from which source said water storage tank 20 is filled by water passing under pressure from said source through said ferrous metal piping at the front and rear ends of said travel trailer 12 and through said non-ferrous metal piping 32. Thereafter said garden hose 42 is disconnected from said water supply source and rewound onto said hose reel 40.

It will thus be seen that there has been provided by my invention a trailer water filling system in which the object hereinabove set forth together with many thoroughly practical advantages has been successfully achieved. While a preferred embodiment of my invention has been shown and described it is to be understood that variations and changes may be resorted to without departing from the spirit of my invention as defined by the appended claims.

What I claim is:

1. A trailer water filling system for use with a trailer having a water storage tank for supplying fresh water and having a towing tongue by which said trailer is towed, said water filling system comprising first metal water piping constructed to be permanently fitted to said trailer and to extend thereon from the outlet of said water storage tank to the front of said trailer at the tongue thereof, support means constructed to be made fast to said tongue for supporting the front end of said first metal water piping, a hose reel assembly constructed to be removable and portable in respect to said trailer and including second metal water piping rotatably supporting said hose reel, said second metal water piping supported at said tongue on said first metal water piping, a rotating seal union joining the inner end of said second metal water piping and the outer end of said first metal water piping, and a flexible hose carried in coiled form on said reel having its inner end connected to the outer end of said second metal piping.

* * * * *